(12) United States Patent
Tanvar et al.

(10) Patent No.: US 12,528,709 B2
(45) Date of Patent: Jan. 20, 2026

(54) ACID WASH OF RED MUD (BAUXITE RESIDUE)

(71) Applicant: Worcester Polytechnic Institute, Worcester, MA (US)

(72) Inventors: Himanshu Tanvar, Worcester, MA (US); Brajendra Mishra, Worcester, MA (US)

(73) Assignee: Worcester Polytechnic Institute, Worcester, MA (US)

( * ) Notice: Subject to any disclaimer, the term of this patent is extended or adjusted under 35 U.S.C. 154(b) by 515 days.

(21) Appl. No.: 17/903,594

(22) Filed: Sep. 6, 2022

(65) Prior Publication Data

US 2023/0051612 A1 Feb. 16, 2023

Related U.S. Application Data

(63) Continuation-in-part of application No. 17/547,557, filed on Dec. 10, 2021, now Pat. No. 12,049,409.
(Continued)

(51) Int. Cl.
*C01F 7/0653* (2022.01)
*C01F 7/066* (2022.01)

(52) U.S. Cl.
CPC ............ *C01F 7/0653* (2013.01); *C01F 7/066* (2013.01)

(58) Field of Classification Search
CPC ............................... C01F 7/0653; C01F 7/066
(Continued)

(56) References Cited

U.S. PATENT DOCUMENTS

| 5,607,598 A | 3/1997 | Williams |
| 9,023,301 B2 | 5/2015 | Boudreault et al. |

(Continued)

FOREIGN PATENT DOCUMENTS

| CN | 107475521 A | * 12/2017 | ........... C22B 34/125 |
| WO | WO-2015058239 A1 | * 4/2015 | ........... B09B 3/0016 |
| WO | 2019113444 A1 | 6/2019 | |

OTHER PUBLICATIONS

Gorrepati et al. "Silica Precipitation in Acidic Solutions: Mechanism, pH Effect, and Salt Effect". Langmuir Article, 2010, 26(13), 10467-10474. (Year: 2010).*
(Continued)

*Primary Examiner* — Coris Fung
*Assistant Examiner* — Catriona M Corallo
(74) *Attorney, Agent, or Firm* — Armis IP Law, LLC

(57) ABSTRACT

Bauxite residue recovery includes mixing a solution of hydrochloric acid (HCL) according to a predetermined concentration, and adding the HCL solution to a quantity of raw red mud recovered from industrial operations as waste material. The highly alkaline property of the bauxite residue, commonly known as red mud is at least partially neutralized from the HCL, and makes the resulting washed red mud more amenable to subsequent uses in various applications in fields such as construction, wastewater treatment, and metal recovery processes. The process recovers washed red mud from the red mud and HCL solution by filtering the raw red mud and HCL solution for generating a stream of leach liquor from the filtrate and the recovered washed red mud from the residue. The neutralized red mud is further treated to extract metals such as calcium, iron, aluminum, silicon, and titanium.

13 Claims, 8 Drawing Sheets

Related U.S. Application Data

(60) Provisional application No. 63/123,753, filed on Dec. 10, 2020.

(58) Field of Classification Search
USPC .......................................................... 423/121
See application file for complete search history.

(56) References Cited

U.S. PATENT DOCUMENTS

| | | |
|---|---|---|
| 9,802,832 B2 | 10/2017 | Krause et al. |
| 9,963,353 B2 | 5/2018 | Zhang et al. |
| 10,836,649 B2 | 11/2020 | Gostu et al. |
| 2020/0239978 A1* | 7/2020 | Papouchado .......... C01G 49/06 |

OTHER PUBLICATIONS

Yu et al. "Red-mud treatment using oxalic acid by UV irradiation assistance". Trans. Nonferrous Met. Soc. China 22(2012) 456-460. (Year: 2012).*
Machine translation of CN 107475521 A. (Year: 2017).*
Dudeney et al. "Photochemical decomposition of trisoxalatoiron(III): A hydrometallurgical application of daylight", 1997. Hydrometallurgy 47, p. 243-257. (Year: 1997).
Mohanty et al. "Optimisation of process parameter using Response Surface Methodology to recover ceramic materials from bauxite mining waste rocks", 2018. IOP Conf. Ser.:Mater. Scl. Eng. 455, p. 1-6. (Year: 2018).

* cited by examiner

| | HCl | $H_2SO_4$ |
|---|---|---|
| Condition | 1M, 13%, 15min | 0.5M, 13%, 15min |
| Input weight | 100 kg | 100 kg |
| After washing | 68 kg | 73 kg |
| Acid required | 63 L (37% w/w) | 24 L (95% w/w) |
| Acid cost | 120 – 250 $/ton | 200 – 265 $/ton |
| Cost input | 7.56 – 15.75 $ | 5.00 – 6.62 $ |

| Acid | | Unit | Ca | Si | Ti | Na | Al | Fe |
|---|---|---|---|---|---|---|---|---|
| HCl | Solid | % | 0.1 | 1.6 | 4.6 | 0.6 | 9.5 | 31.7 |
| | Liquid | ppm | 2986.3 | 4320.1 | 11.1 | 4370.4 | 179.9 | 4908.1 |
| $H_2SO_4$ | Solid | % | 2.4 | 1.9 | 4.4 | 0.8 | 7.6 | 26.6 |
| | Liquid | ppm | 550.8 | 4841.4 | 16.5 | 3963.7 | 363.1 | 3873.9 |

ACID WASH OF RED MUD (BAUXITE RESIDUE)

RELATED APPLICATIONS

This patent application is a Continuation-in-Part (CIP) of U.S. utility application Ser. No. 17/547,557, filed Dec. 10, 2021, entitled, "ACID WASH OF RED MUD (BAUXITE RESIDUE)", and which claims the benefit under 35 U.S.C. § 119(e) of U.S. Provisional application No. 63/123,753, filed Dec. 10, 2020, entitled "ACID WASH OF RED MUD (BAUXITE RESIDUE)". Each of these applications are hereby incorporated by reference herein in their entireties.

BACKGROUND

Bauxite residue, also known as "red mud," is a by-product of aluminum production, and in conventional approaches is typically discarded. Red mud is often dumped as waste, which has triggered environmental concerns in recent years. Industrial processes such as alumina production from bauxite residue generate substantial quantities of raw red mud, which often end up in landfills and has a serious impact on the environment. The high alkali content in red mud restricts its use as a building material, soil aggregate, and wastewater treatment reagent and even makes the valuable metals recovery processes for iron, aluminum and titanium complicated and expensive.

SUMMARY

A method for recycling bauxite residue includes mixing a solution of hydrochloric acid (HCL) according to a predetermined concentration, and adding the HCL solution to a quantity of raw red mud recovered from industrial operations as waste material. The highly alkaline property of the bauxite residue, commonly known as red mud is at least partially neutralized with HCL, and makes the resulting washed red mud more amenable to subsequent uses in various applications in fields such as construction, wastewater treatment, and metal recovery processes. The process recovers washed red mud from the red mud and HCL slurry by filtering the raw red mud and HCL solution for generating a stream of leach liquor from the filtrate and the recovered washed red mud from the residue.

Configurations herein are based, in part, on the observation that aluminum production generates substantial quantities of bauxite residue as a by-product. Bauxite residue contains small amounts of valuable metals, such as Ni, Mg and Co often used in batteries as well as other rare earths. However, the bauxite residue tends to be highly alkaline in pH, and its high soda content restricts further use such as in brick making and iron smelting industries. Furthermore, the hazardous nature of bauxite residue makes transportation and shipping to the recycling facilities difficult and expensive. Unfortunately, conventional approaches to bauxite recycling typically focus on extraction of these trace amounts of metals, rather than recycling of the larger volume of solids contained in the bauxite residue. Accordingly, configurations herein substantially overcome the shortcomings of conventional bauxite recycling by providing a process and method of neutralizing bauxite residue for transport and use in applications such as construction and materials processing.

In a particular configuration, red mud, also known as bauxite residue or simply bauxite, is neutralized with a mild hydrochloric acid (0.5-1 M) wash, followed by filtration to obtain neutralized red mud. Acid washing, which may also include sulfuric acid, is carried out with a pulp density of 10-15% for 10-15 minutes duration. Solid-liquid separation is performed using bag filters or filter press with a cut off size of 10 and 1 microns. Physical agitation of the slurry increases the solid to liquid contact ratio and accelerates the neutralization process. The pregnant leach liquor can be further processed to recover alumina via an acid-base neutralization route.

The washed red mud has increased iron composition and reduced sodium and calcium than the raw red mud prior to washing, in addition to other changes. Further applications include retrieving the leach liquor from the HCL solution used for the washed red mud, and recovering alumina and other solutes from the leach liquor via acid-base neutralization. In a typical configuration the HCL solution has a concentration between 0.5-1.0 M, and preferably around 0.7 M.

In further detail, a method for recovering and recycling bauxite residue as discussed further below includes mixing an acid wash solution according to a predetermined concentration, and neutralizing a quantity of bauxite residue recovered from industrial operations as waste material by combining and washing the bauxite residue with the acid wash solution. The result is neutralized bauxite residue from the bauxite residue and the acid wash solution, where the neutralized bauxite residue has a substantially neutral pH around 6 or 7. Subsequent leaching also provides input to magnetite production.

In some embodiments, the bauxite residue is subjected to leaching with hydrochloric acid and filtered to obtain neutralized residue and liquid filtrate. The filtrate or pregnant leach liquor is further processed to recover alumina, silica and calcium carbonate by polymerization and acid-base neutralization. The pH of the leach liquor is increased to a value of 3-3.5 to initiate polymerization. The leach liquor is further aged for at least 12 hours to 5 days to complete polymerization and filtered. The polymerized silica is obtained as a filtride, and the filtrate can be further processed to obtain alumina. The pH of the filtrate is increased to precipitate aluminum hydroxide which is recovered by filtration and is calcined to obtain alumina. The solution remaining after precipitating aluminum hydroxide can be carbonated using $CO_2$ gas to obtain a calcium carbonate precipitate.

In other embodiments, the neutralized bauxite residue obtained after leaching with hydrochloric acid is leached again with oxalic acid and filtered to obtain a solid oxalic filtride and an oxalic leach liquor. The leach liquor is photochemically reduced to precipitate ferrous oxalate. The ferrous oxalate is recovered by filtration and is optionally decomposed to obtain magnetite powder. In some embodiment, the photochemically reduced filtrate is recycled for oxalic acid leaching.

In some embodiments, the oxalic filtride is mixed with sulfuric acid and heated for a sulfation reaction. The heated mixture is then dissolved in water and filtered. The filtrate is treated with iron powder to reduce the dissolved $Fe^{+3}$ ions to $Fe^{+2}$ ions. The reduced solution is then boiled to induce hydrolysis and to precipitate titanium dioxide which is recovered by filtration.

BRIEF DESCRIPTION OF THE DRAWINGS

The foregoing and other features will be apparent from the following description of particular embodiments disclosed herein, as illustrated in the accompanying drawings

DETAILED DESCRIPTION

Depicted below is an example of red mud washing for neutralizing the caustic properties and leaching constituent metals and useful elements from the former waste material. Red mud, also known as bauxite residue or simply bauxite, results from aluminum production, which generates substantial quantities that often end up in landfills and may have a serious impact on the environment. The high alkali content in red mud restricts its use as a building material, soil aggregate, and wastewater treatment reagent and even makes the valuable metals recovery processes for iron, aluminum and titanium complicated and expensive. Configurations below neutralize the red mud and reduce the alkali content to below 1% through an acid washing process. Leaching behavior of different elements (Ca, Si, Ti, Na, Al, Fe) in HCl and $H_2SO_4$ solution is performed. The experimental and characterization results show the separation of more than 90% Na and Ca, 40% Al, 60% Si into the solution after acid washing with HCl or $H_2SO_4$.

Conventional approaches to red mud processing attempt an acid-base reaction, and carbonation including bubbling of $CO_2$ containing flue gas through a slurry to form carbonic acid in an aqueous solution which neutralizes the basic components. These conventional approaches result in separation of only 20-30% alkali content (free sodium), however, industrial application of red mud in construction and concrete industries requires alkali content to be as low as below 1%. Roasting with sodiumbased flux (sodium carbonate, hydroxide, sulfate) may be efficient in removing Al and Na via the formation of water soluble sodium silicate and sodium aluminum silicate phases. However, these require substantial energy and external flux (NaOH) for the heat treatment and is often not economical.

Figure 1:
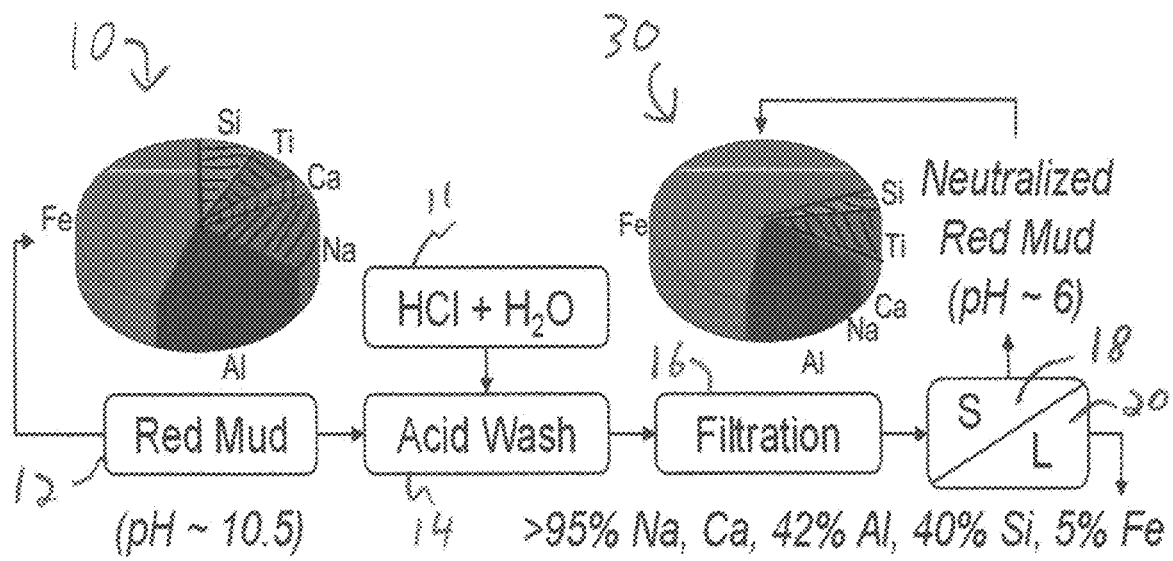
FIG. 1 is a context diagram of acid washing of bauxite residue for producing yields as disclosed in configurations herein.

FIG. 1 is a context diagram of acid washing of bauxite residue for producing yields as disclosed in configurations herein. Referring to FIG. 1, the method for recovering and recycling bauxite residue having a composition 10 as disclosed herein includes mixing an acid wash solution according to a predetermined concentration at step 11, and neutralizing the quantity of bauxite residue 12 recovered from industrial operations as waste material by combining and washing the bauxite residue with the acid wash solution, at step 14. Typical configurations receive the bauxite residue as a byproduct of an aluminum production process. Filtration 16 recovers neutralized bauxite residue 18 from the bauxite residue (solid) and the acid wash solution 20 (liquid), such that the neutralized bauxite residue has a pH<7.0 and the composition 30. The initial bauxite residue 10 has a pH greater than 10.0 and the washed bauxite residue has a pH around 6.0 or lower, in contrast to conventional approaches. The acid wash solution 11 may be mixed using at least one of hydrochloric or sulfuric acid, or other suitable acid solution as needed.

Leaching processes have been performed in a 500 mL Pyrex beaker using a magnetic stirrer. The solid residue was separated from the leach solution by vacuum filtration using Whatman (grade 1) qualitative filter paper. The solid residue was dried in a laboratory oven at 95° C. for 12 h. Solid residue and leach solution were further analyzed to determine the metal content and the corresponding dissolution value.

The elemental analysis of the samples was carried out using PerkinElmer® Optima 8000 Inductively Coupled Plasma-Optical Emission Spectroscopy (ICP-OES). Solid samples were fused using borate flux at 1000° C. for 1 h and dissolved in 25% nitric acid and further diluted with 2% nitric acid for ICP-OES (inductively coupled plasma-optical emission spectrometer) analysis. In contrast, liquid samples were analyzed after proper dilution.

Mineral phase analysis was carried out using the PANalytical Empyrean X-ray diffractometer (XRD) using Cr tube line focus. The diffraction data were recorded in the 2-theta range of 10-80° with a scanning rate of 2°/min and a step size of 0.02°. The quantitative phase analysis was conducted by presuming triangular peaks and the underlying peak area depicting the phase quantity.

Figure 2:
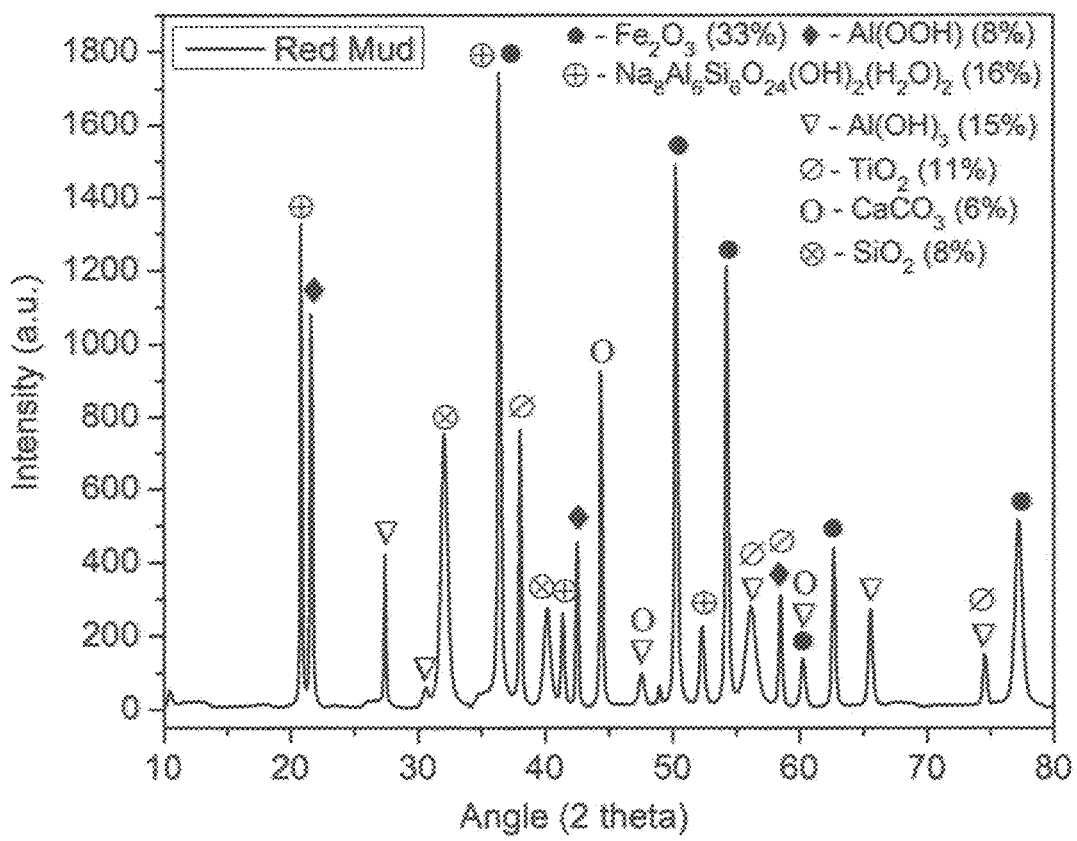
FIG. 2 is an XRD (X-Ray Diffraction) of a bauxite residue sample received in conjunction with configurations herein.

Bauxite residue used in this study is mainly composed of Fe (21.3%), Al (9.98%) and Na (3.4%), along with Ca (2%), Si (2.8%) and Ti (3.4%). The complete elemental composition analysis is shown in Table I. The pH value of the raw bauxite residue slurry in water was determined as 10.5, reflecting high basic nature. Referring to FIG. 2, an XRD (X-Ray Diffraction) rendering of a bauxite residue sample received in conjunction with configurations herein is shown. The XRD spectrum in FIG. 2 reveals that the Fe values are present in the form of hematite ($Fe_2O_3$) phase, Al values are associated with boehmite (Al(OOH)) and gibbsite (Al(OH)$_3$), whereas Ti is present in the form of anatase ($TiO_2$). Calcium carbonate ($CaCO_3$), quartz ($SiO_2$), and sodium aluminum silicate hydrate ($Na_8Al_6Si_6O_{24}(OH)_2$ $(H2O)_2$) are the other mineral phases present in the bulk bauxite residue sample.

TABLE I

| Elt. | Wt % |
| --- | --- |
| Al | 9.98 |
| Fe | 21.30 |
| Mn | 0.09 |
| Mg | 0.06 |
| Cr | 0.08 |
| K | 0.44 |
| Ca | 2.00 |
| Si | 3.80 |
| Ti | 3.36 |
| Na | 6.71 |

Figure 3:
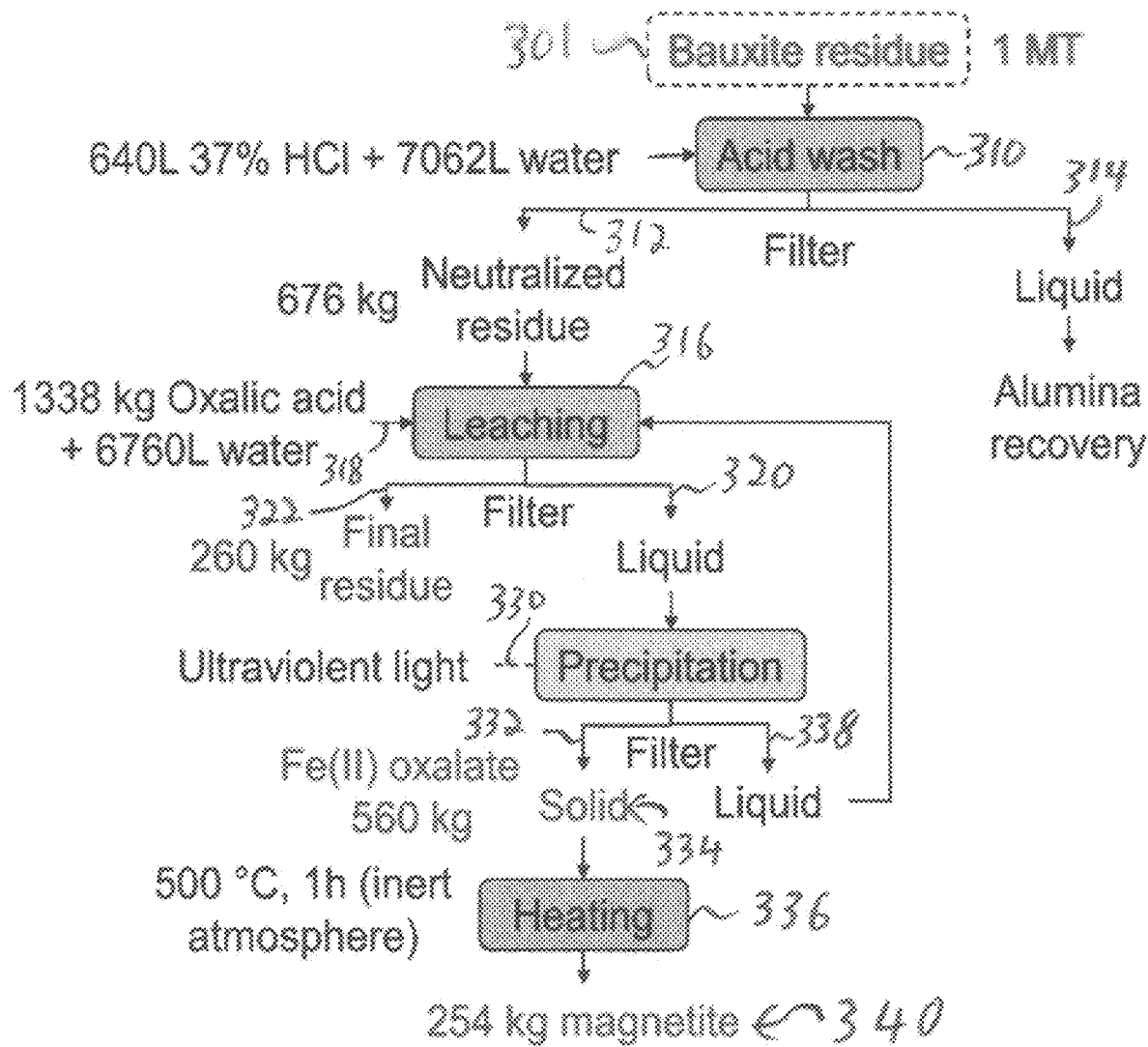
FIG. 3 is a process flow of bauxite residue processing using a sample as in FIG. 2.

FIG. 3 is a process flow 300 of bauxite residue using a sample as in FIG. 2. The basic compositional improvement is achieved through lowering of sodium and calcium and increase of iron oxide content. Referring to FIG. 3, a metric ton (MT) of bauxite residue 301 is neutralized with a mild hydrochloric acid (0.5-1 M) wash 310, forming a slurry, followed by filtration to obtain neutralized red mud. Respective quantities are noted. Acid washing is carried out with a pulp density of 10-15% for 10-15 minutes duration. Solid-liquid separation is performed using bag filters or filter press with a cut off size of 10 and 1 microns. Physical agitation of the slurry may increase the solid to liquid contact ratio and accelerate the neutralization process. The pregnant leach liquor 314 can be further processed to recover alumina via an acid-base neutralization route.

The neutralized bauxite residue undergoes a further leach phase to generate a leach solution including the neutralized bauxite residue and a leach agent, such that the leach agent has a concentration selected based on an iron content in the neutralized bauxite residue. In a particular configuration, the leach agent is oxalic acid having a concentration between 1.5 and 2.5 molar, and further includes leaching the slurry at around 95° C. for between 2 and 3 hours. In the example of FIG. 3, the neutralized bauxite residue 312 is further leached 316 with oxalic acid 318 at an acid concentration of 2 Molar, 95° C. temperature for 2.5 hour. The acid concentration can be variable based on the $Fe_2O_3$ content in the neutralized bauxite residue. The neutralized bauxite residue forms a slurry from the leach solution and is filtered to generate a leach liquor and a solid residue of washed bauxite residue. The reacted slurry is filtered through a filter press to obtain leach liquor 320 and solid residue 322, thus separating the leach liquor from the slurry. The solid residue can be stored and further processed to recover $TiO_2$ in downstream processing. The leach liquor is photochemically reduced using ultraviolent light 330 (250-500 nm wavelength) to precipitate out ferrous oxalate 332. Directing UV (ultraviolet light) at the leach liquor 320 induces a photochemical reduction for precipitating the iron in the form of ferrous oxalate via photochemical reduction. The photochemical reduction time will depend on the quantity of the liquid processed, the power of the light source and equipment design. The photochemical reduction can also be performed by using direct sunlight eliminating power requirements. The liquid leach 338 from the oxalic acid solution contains Al which may be precipitated/harvested. Filtering the ferrous oxalate forms a magnetite precursor. This can be decomposed in an inert atmosphere heated to around 500° C. for around 1 hour to form magnetite. The ferrous oxalate precipitate 334 is recovered from the reduced solution via filtration and further decomposed to convert into magnetite powder 340. The decomposition heating 336 reaction is carried out in an inert atmosphere of $N_2$ gas at a process temperature of 500° C. for 1 h in a tubular furnace. Alternative heating and/or decomposition may be employed. Thus, the neutralized bauxite residue is processed to recover high purity magnetite powder with wide industrial applicability.

Figure 4A:
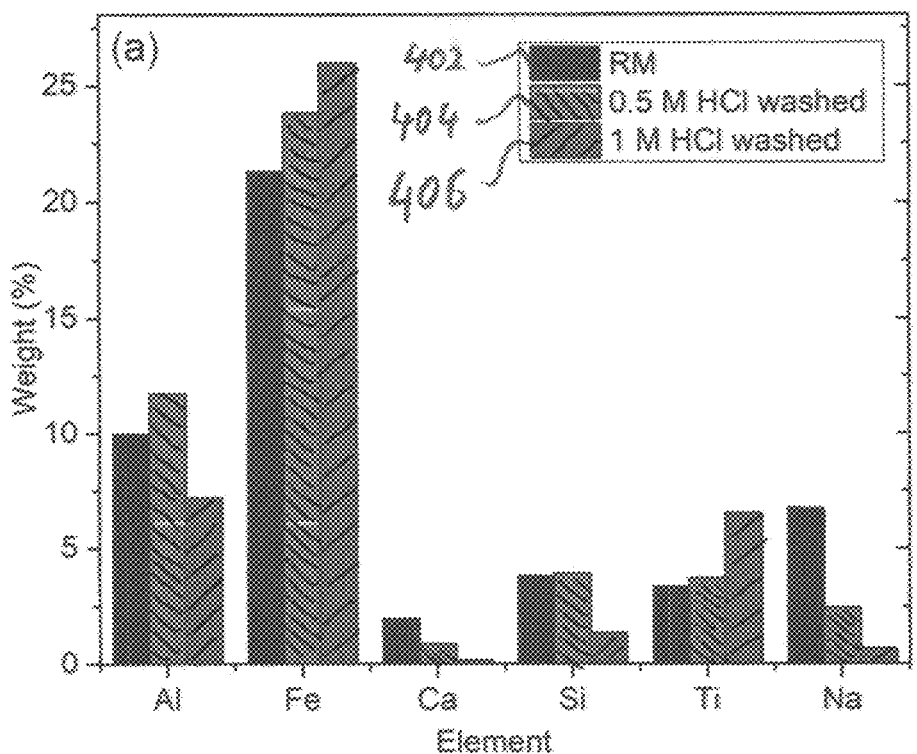
FIGS. 4A and 4B show elemental composition and XRD spectra of the bauxite residue sample of FIG. 2 following processing as in FIG. 3.
Figure 4B:
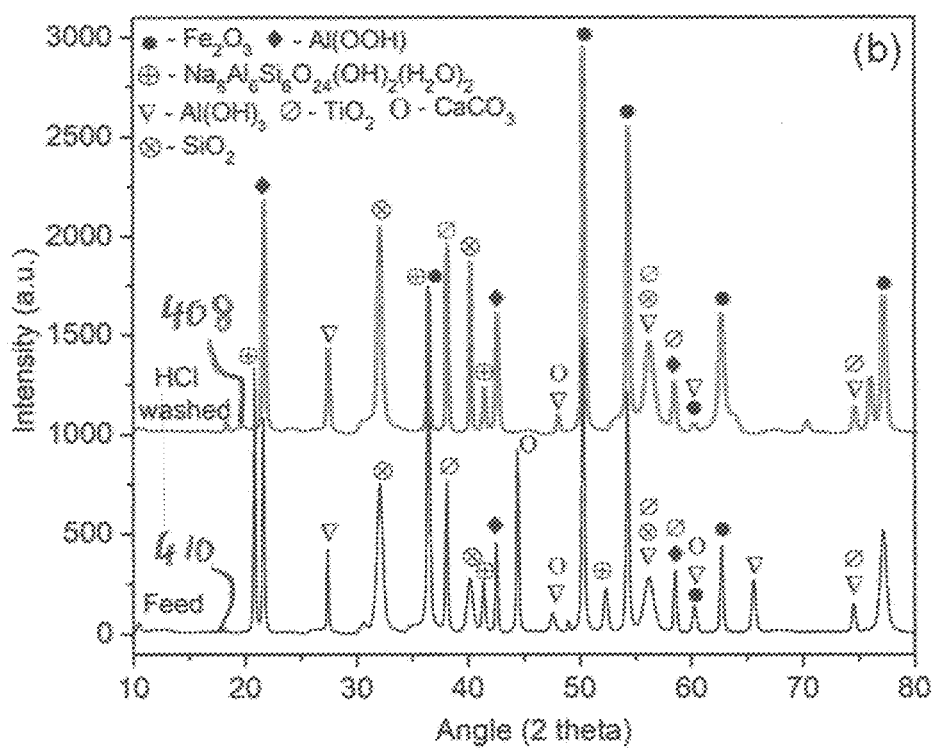

FIGS. 4A and 4B show elemental composition and XRD spectra of the bauxite residue sample of FIG. 2 following processing as in FIG. 3. Referring to FIGS. 1, 4A and 4B, the basic oxides (NaOH, $CaCO_3$) in the bauxite residue can be separated after washing with mild hydrochloric acid (HCl). The chemical reaction for different components present in bauxite residue with HCl is shown in Eq. (1) to (5) below. The thermodynamic equilibrium calculations for the reaction of different phases present in bauxite residue was carried out using HSC Chemistry 5.11 software, and the Gibbs free energy at 40° C. was found to be negative for Na and Ca phases. The more negative value of Gibbs free energy for NaOH and $CaCO_3$ indicates a spontaneous equilibrium reaction compared with $Al(OH)_3$ and $Fe_2O_3$. The stoichiometric requirement of HCl was calculated at 0.26 g per gram of bauxite residue for the complete dissolution of Na and Ca in bauxite residue, and therefore, preliminary experiments were conducted at 0.7 M HCl concentration at 10% pulp density and 40° C. for 15 min. Approximately 67% Na, 60% Ca, 8% Si, and 1% Fe were leached out. Furthermore, increasing the acid concentration to 1M HCl recovered more than 95% Na and Ca along with approximately 40% Al and 75% Si. Dissolution of Al and Si, along with Na and Ca, increases the acid demand during neutralization, and therefore high Na and Ca removal efficiency is achieved at acid dosage excess to the stoichiometric requirement.

The composition (wt %) of feed 402, 0.5 M 404, and 1 M 406 HCl washed bauxite residue is shown in FIG. 4A. The Na and Ca content dropped to 0.67% and 0.18%, respectively, after 0.5 M and 1 M HCl wash. On the other hand, Fe concentrated up to 26% in the residue. The XRD spectra of bauxite residue 410 and 1 M 408 HCl washed bauxite residue shown in FIG. 4B, shows that the peaks intensity corresponding to sodium aluminum silicate (2 theta=20.8°, 52.39°) and calcite phase (2 theta=44.4°) dropped to zero after HCl wash. The XRD analysis shows that HCl wash predominantly dissociated sodium aluminum silicate and calcium carbonate phases and dissolved corresponding Na, Al, Si, and Ca values. Based on preliminary experiments, it was found that Na and Ca are leached into the solution in a concise duration (~15 min) and extended leaching results in the dissolution of other elements. Therefore, the leaching time was fixed at 15 min. Furthermore, to optimize other leaching parameters (acid concentration, S/L ratio, and temperature) and to study the corresponding impact on elemental dissolution, the statistical design of experiments was pursued. Equations applicable to the HCL based neutralization are as follows:

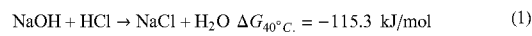
$$NaOH + HCl \rightarrow NaCl + H_2O \quad \Delta G_{40°C.} = -115.3 \text{ kJ/mol} \quad (1)$$

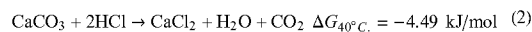
$$CaCO_3 + 2HCl \rightarrow CaCl_2 + H_2O + CO_2 \quad \Delta G_{40°C.} = -4.49 \text{ kJ/mol} \quad (2)$$

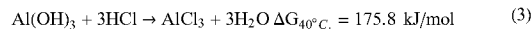
$$Al(OH)_3 + 3HCl \rightarrow AlCl_3 + 3H_2O \quad \Delta G_{40°C.} = 175.8 \text{ kJ/mol} \quad (3)$$

$$Fe_2O_3 + 6HCl \rightarrow 2FeCl_3 + 3H_2O \quad \Delta G_{40°C.} = 124.8 \text{ kJ/mol} \quad (4)$$

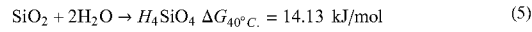
$$SiO_2 + 2H_2O \rightarrow H_4SiO_4 \quad \Delta G_{40°C.} = 14.13 \text{ kJ/mol} \quad (5)$$

The dissolution of various elements was as follows; 1-10% Fe, 40-56% Al, 60-75% Si, and more than 95% Na and Ca. The Ti values behaved inert during HCl wash and reports to the residue. The leach solution at high acid concentration formed gelatinous liquid due to silica gel formation. The silica soluble in the form of silicic acid $(Si(OH)_4)$ monomer connected through the Si—O—Si bond and form polysilicic acid, which further causes gelation. The presence of free $H^+$ accelerates the polymerization rate and therefore, highly depends on the pH, temperature, and ionic strength. A final pH value of approximately 2.45 was obtained at the end of the washing. The bauxite residue washing resulted in the dissolution of approximately 42% Al, 5% Fe, 96% Ca, 40% Si, and 94% Na. The composition of bauxite residue washed at the optimized conditions is shown in Table II.

TABLE II

| Elt. | Red Mud (%) |
| --- | --- |
| Al | 9.54 |
| Fe | 31.65 |
| Mn | 0.06 |
| Mg | 0.03 |
| Cr | 0.12 |
| K | 0.39 |
| Ca | 0.11 |
| Si | 1.58 |
| Ti | 4.57 |
| Na | 0.59 |

Sulfuric acid was also tested for neutralization of alkali in the bauxite residue. Sulfuric acid being diprotic acid, it is expected that the required acid concentration should be half of that of hydrochloric acid. The Gibbs free energy for reaction of different species present in red mud with $H_2SO_4$ is shown in Eq. (6) to (9). The Gibbs free energy is negative for all the elements (Na, Ca, Al, Fe), showing thermodynamic feasibility for dissolution in the acid solution. Leaching experiments were carried out using $H_2SO_4$ with a pulp density and the leaching time of 10% and 15 min, respectively, while the acid concentration was varied between 0.1 M to 1.5 M. Calcium was separated as insoluble calcium sulfate in the residue. The pH at the end of the washing was 1.7. Na dissolution dropped to 80%, with a decrease in acid concentration to 0.25 M at 10% S/L. The pulp density was further increased to 13% and approximately 94% Na, 25% Ca, 81% Si, 1% Ti, 9% Fe, 45% Al were recovered into the solution, and the slurry's final pH was 2.94. Further increase in pulp density caused the silica to polymerize and form silica, causing difficulty in filtration; therefore, 13% S/L was found optimal.

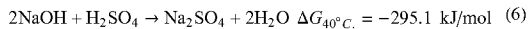

$$2NaOH + H_2SO_4 \rightarrow Na_2SO_4 + 2H_2O \quad \Delta G_{40°C.} = -295.1 \text{ kJ/mol} \quad (6)$$

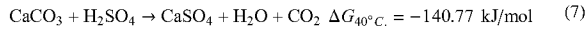

$$CaCO_3 + H_2SO_4 \rightarrow CaSO_4 + H_2O + CO_2 \quad \Delta G_{40°C.} = -140.77 \text{ kJ/mol} \quad (7)$$

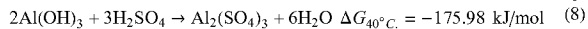

$$2Al(OH)_3 + 3H_2SO_4 \rightarrow Al_2(SO_4)_3 + 6H_2O \quad \Delta G_{40°C.} = -175.98 \text{ kJ/mol} \quad (8)$$

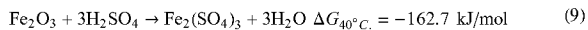

$$Fe_2O_3 + 3H_2SO_4 \rightarrow Fe_2(SO_4)_3 + 3H_2O \quad \Delta G_{40°C.} = -162.7 \text{ kJ/mol} \quad (9)$$

Figure 5:
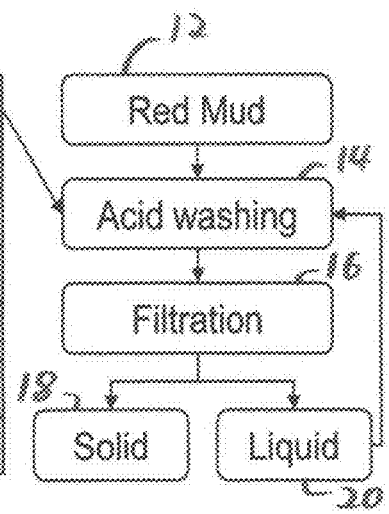
FIG. 5 shows a comparison of HCL and sulfuric acid for acid washing.

Based on the acid washing experiments carried out, the comparison between HCl and $H_2SO_4$ as a reagent to actively separate alkali (Na, Ca) from bauxite residue is shown in FIG. 5. It was found that Na removal depends upon the concentration of $H^+$ ions in the solution, therefore, 1 M HCl solution resulted in similar result as with 0.5 M $H_2SO_4$. The bauxite residue slurry pH was reduced from ~10.5 to ~2.5 along with the dissolution of approx. 38% solid mass with HCl and 27% with $H_2SO_4$. Both the acids completely dissociated the sodium aluminum silicate phase at the optimized conditions and separated more than 90% Na, 40-45% Al, 60% Si and less than 10% Fe. The key difference between the two acid is the limited separation of Ca with $H_2SO_4$ due to formation of insoluble $CaSO_4$. The leach solution from both HCl and $H_2SO_4$ wash consist of high amount of Al (~4500 ppm), along with Si (~4400 ppm), Na (4000 ppm), and Ca (500-3000 ppm). The pH adjustment of the leach solution can be employed to recover the alumina values, and the remaining solution can be recirculated for acid washing. The costs of HCl and $H_2SO_4$ may be a factor in selecting one over the other. Based on the optimized conditions, cost of HCl and $H_2SO_4$ required for alkali separation is 7.56 $-15.75 $ and 5.00 $-6.62 $ per 100 kg of bauxite residue, respectively. Based on the material balance and cost analysis $H_2SO_4$ seems to be a better reagent with separation of more than 90% Na, and retains around 73% of solid mass after washing, compared to 62% with HCl. However, for separation of Ca, washing with HCl is recommended.

The composition for bauxite residue neutralized in Sulfuric acid is shown in Table III.

TABLE III

| Elt. | Red Mud (%) |
| --- | --- |
| Al | 7.55 |
| Fe | 26.61 |
| Mn | 0.04 |
| Mg | 0.02 |
| Cr | 0.10 |
| K | 0.27 |
| Ca | 2.36 |
| Si | 1.95 |
| Ti | 4.39 |
| Na | 0.76 |

Based on the acid washing experiments carried out, the comparison between HCl and $H_2SO_4$ as a reagent to actively separate alkali (Na, Ca) from bauxite residue is shown in FIG. 5. It was found that Na removal depends upon the concentration of $H^+$ ions in the solution, therefore, 1 M HCl solution resulted in similar result as with 0.5 M $H_2SO_4$. The bauxite residue slurry pH was reduced from ~10.5 to ~2.5 along with the dissolution of approx. 38% solid mass with HCl and 27% with $H_2SO_4$. Both the acids completely dissociated the sodium aluminum silicate phase at the optimized conditions and separated more than 90% Na, 40-45% Al, 60% Si and less than 10% Fe. The key difference between the two acid is the limited separation of Ca with $H_2SO_4$ due to formation of insoluble $CaSO_4$. The leach solution from both HCl and $H_2SO_4$ wash consist of high amount of Al (~4500 ppm), along with Si (~4400 ppm), Na (4000 ppm), and Ca (500-3000 ppm). The pH adjustment of the leach solution can be employed to recover the alumina values, and the remaining solution can be recirculated for acid washing. The costs of HCl and $H_2SO_4$ may be a factor in selecting one over the other. Based on the optimized conditions, cost of HCl and $H_2SO_4$ required for alkali separation is 7.56 $-15.75 $ and 5.00 $-6.62 $ per 100 kg of bauxite residue, respectively. Based on the material balance and cost analysis $H_2SO_4$ seems to be a better reagent with separation of more than 90% Na, and retains around 73% of solid mass after washing, compared to 62% with HCl. However, for separation of Ca, washing with HCl is recommended.

The acid-washed alkali reduced material is therefore suitable for use as a building material (additive in cement, mortar, concrete, geopolymers), as a soil aggregate, wastewater treatment, glass ceramics, and for valuable metal recovery. Differences between HCL and $H_2SO_4$ neutralization of FIGS. 1 and 3 is shown in FIG. 5

Figure 6:
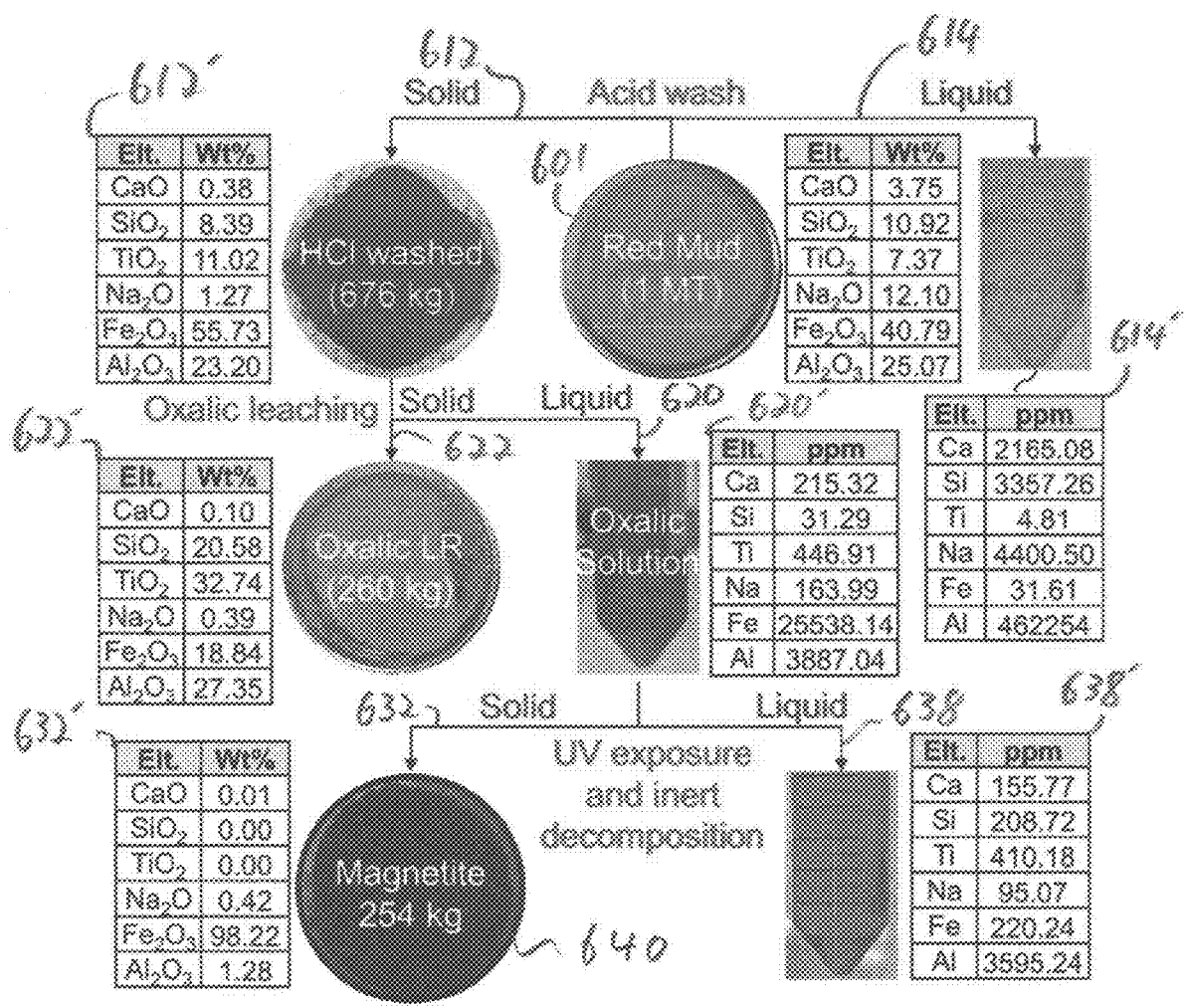
FIG. 6 shows incremental elemental composition along the steps of FIG. 3.

FIG. 6 shows incremental elemental composition along the steps of FIG. 3. Referring to FIGS. 3 and 6, the bauxite residue and acid wash yields neutralized solids 612 and liquid 614 products, having a respective composition 612' and 614', from initial bauxite residue composition 601'. The subsequent oxalic acid leach also generates solid 622 and liquid 620 products, having respective compositions 622' and 620'. Photochemical reduction of the oxalic acid leach generates magnetite precursor solids 632 with composition 632', and leach liquor 638 including titanium and aluminum at a concentration of at least 400 ppm and 3595 ppm, in composition 638'.

Figure 7:
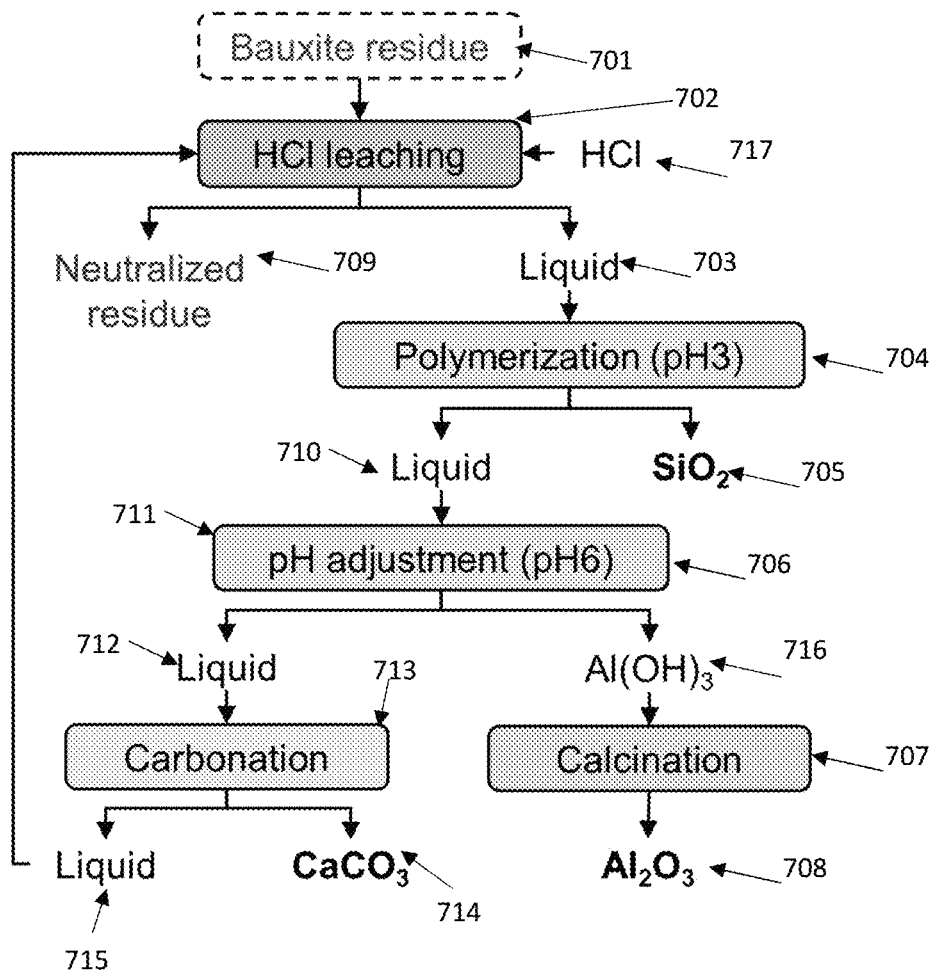
FIG. 7 is a schematic drawing depicting process flow of bauxite residue processing for extracting alumina, silica, and calcium carbonate.

FIG. 7 is a process flow 700 of bauxite residue to extract alumina, silica, and calcium. The bauxite residue 701 is neutralized with a mild hydrochloric acid 717 (0.5-1 M) wash 702, followed by filtration to obtain neutralized red mud 709. Acid washing is carried out with a pulp density of 10-15 Wt. % for 10-15 minutes. The solid-liquid separation is performed using a filter press. Physical agitation of the slurry increases the solid to liquid contact ratio and accelerates the neutralization process. The pregnant leach liquor 703 is further processed to recover alumina, silica and calcium carbonate via polymerization and acid-base neutralization route. Solution aging is performed by adjusting the solution pH to 3 and keeping the solution ideal for 1 to 3 days to initiate polymerization 704. At the end of the aging period, the solution is filtered using filter press/vacuum filtration to obtain precipitated polymerized silica (pH3 precipitate) 705 and liquid filtrate solution 710. The pH of the solution is subsequently increased 711 to 6.5-7 to precipitate aluminum hydroxide (pH 6 precipitate) 716. Aluminum hydroxide precipitate 716 are recovered after filtration and further calcined 707 at 1000° C. for 1 h in a muffle furnace to obtain alumina ($Al_2O_3$) 708. The solution after Al precipitation 712 is subjected to carbonation 713 to recover Ca precipitate. Carbonation 713 is performed by continuously passing $CO_2$ gas through the solution at atmospheric pressure for 30 min at pH 10. The carbonated slurry is filtered to obtain calcium carbonate precipitate 714 and liquid solution 715 which can be recycled to the HCL leaching stage 702.

Figure 8:
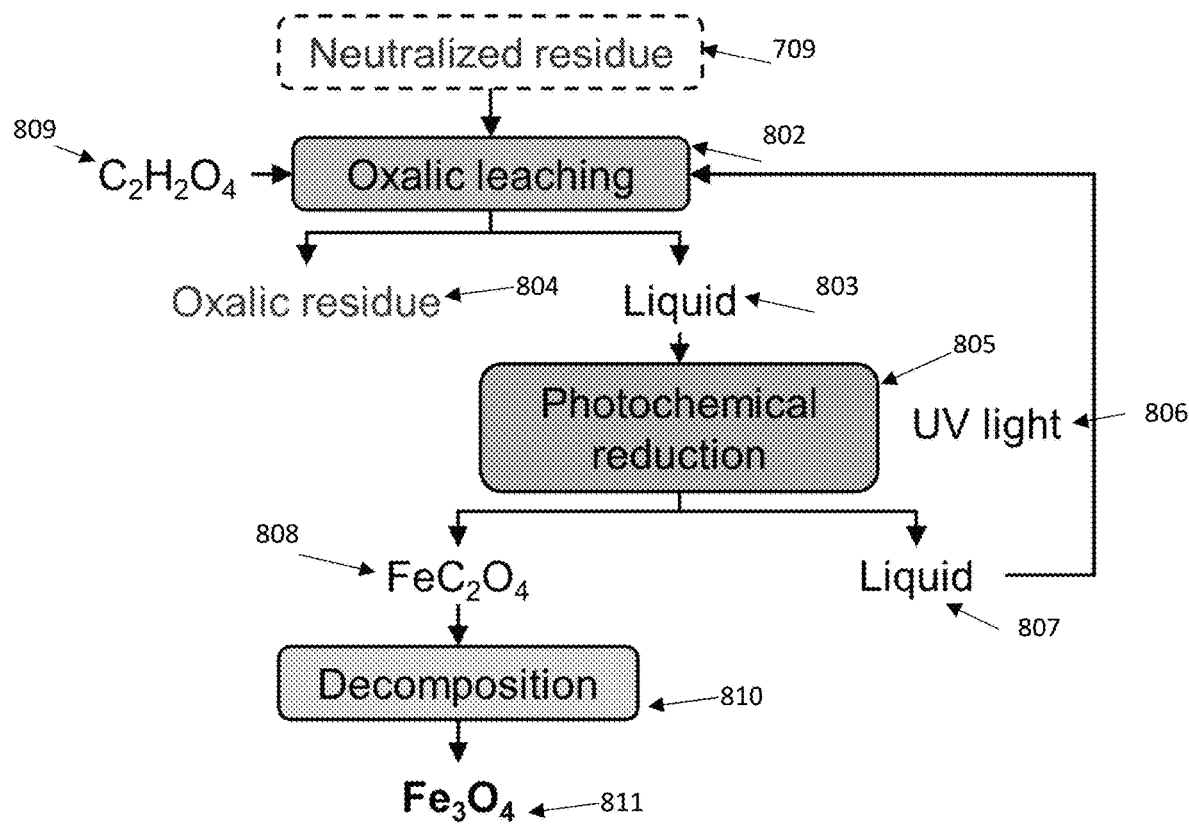
FIG. 8 is a schematic drawing depicting process flow of a neutralized residue processing for extracting magnetite.

FIG. 8 shows a process flow 800 of neutralized bauxite residue to extract iron. The neutralized bauxite residue 709 is further leached 802 with oxalic acid 809 at an acid concentration of 2 Molar, 95° C. temperature for 2.5 hour under continuous agitation. The leaching reaction 802 resulted in dissolution of more than 90% Fe along with 48% Al, 5% Si, and <1% Ti. The acid concentration is variable based on the $Fe_2O_3$ content in the neutralized bauxite residue 709. The reacted slurry is filtered through a filter press to obtain leach liquor 803 and solid residue (oxalic residue) 804. The leach liquor is photochemically reduced 805 using ultraviolent light (250-500 nm wavelength) 806 to precipitate ferrous oxalate 808. The photochemical reduction time depends on the quantity of the liquid processed, the power of the light source and the equipment design. In the current configuration of photochemical reduction 805, reduction is carried out for a duration of 6-8 h and resulted in precipitation of 99% Fe as ferrous oxalate 808, leaving other dissolved species in the filtrate 807. The photochemical reduction can be performed using direct sunlight eliminating power requirements and can be accelerated with use of other reducing agents such as iron powder. Ferrous oxalate precipitate 808 is recovered from the reduced solution via filtration and further decomposed 810 to convert into magnetite powder 811. The decomposition reaction is carried out in an inert atmosphere of $N_2$ gas at a process temperature of 450-500° C. for 1 h in a tubular furnace. The final solution 807 after Fe precipitation is further recycled into the oxalic leaching stage 802 and helps with reagent regeneration and utilization.

TABLE IV

| Sample | Quantity | Elt | CaO | $SiO_2$ | $TiO_2$ | $Na_2O$ | $Fe_2O_3$ | $Al_2O_3$ |
|---|---|---|---|---|---|---|---|---|
| Bauxite residue | 1 ton | % | 3.75 | 10.92 | 7.37 | 12.10 | 40.79 | 25.07 |
| $SiO_2$ | 110 kg | % | 6.13* | 49.67 | — | 16.70* | — | 27.50+ |
| $Al_2O_3$ | 53 kg | % | 0.21 | 0.79 | — | 0.55 | — | 98.45 |
| $CaCO_3$ | 23 kg | % | 99.01⁻ | — | — | 0.99 | — | — |
| $Fe_3O_4$ | 254 kg | % | 0.01 | — | — | 0.42 | 98.92 | 0.58 |
| $TiO_2$ | 62 kg | % | — | 0.06 | 98.55 | — | 0.22 | 1.17 |
| Residue | 109 kg | % | 0.01 | 70.53 | 12.29 | 0.01 | 6.86 | 10.32 |
| Stage 1 liquid | 7692 L | ppm# | 51.00* | 1.23 | — | 8510.11* | — | 7.92* |
| Stage 2 liquid | 6760 L | ppm# | 659.00 | 108.11 | 1579.42 | 332.55 | 1266.12 | 15113.21 |
| Stage 3 liquid | 2600 L | ppm# | — | — | 55.10 | — | 9080.00 | 7190.20 |

*(chloride), +(hydroxide), #(ion in solution), ⁻(Carbonate)

Figure 9:
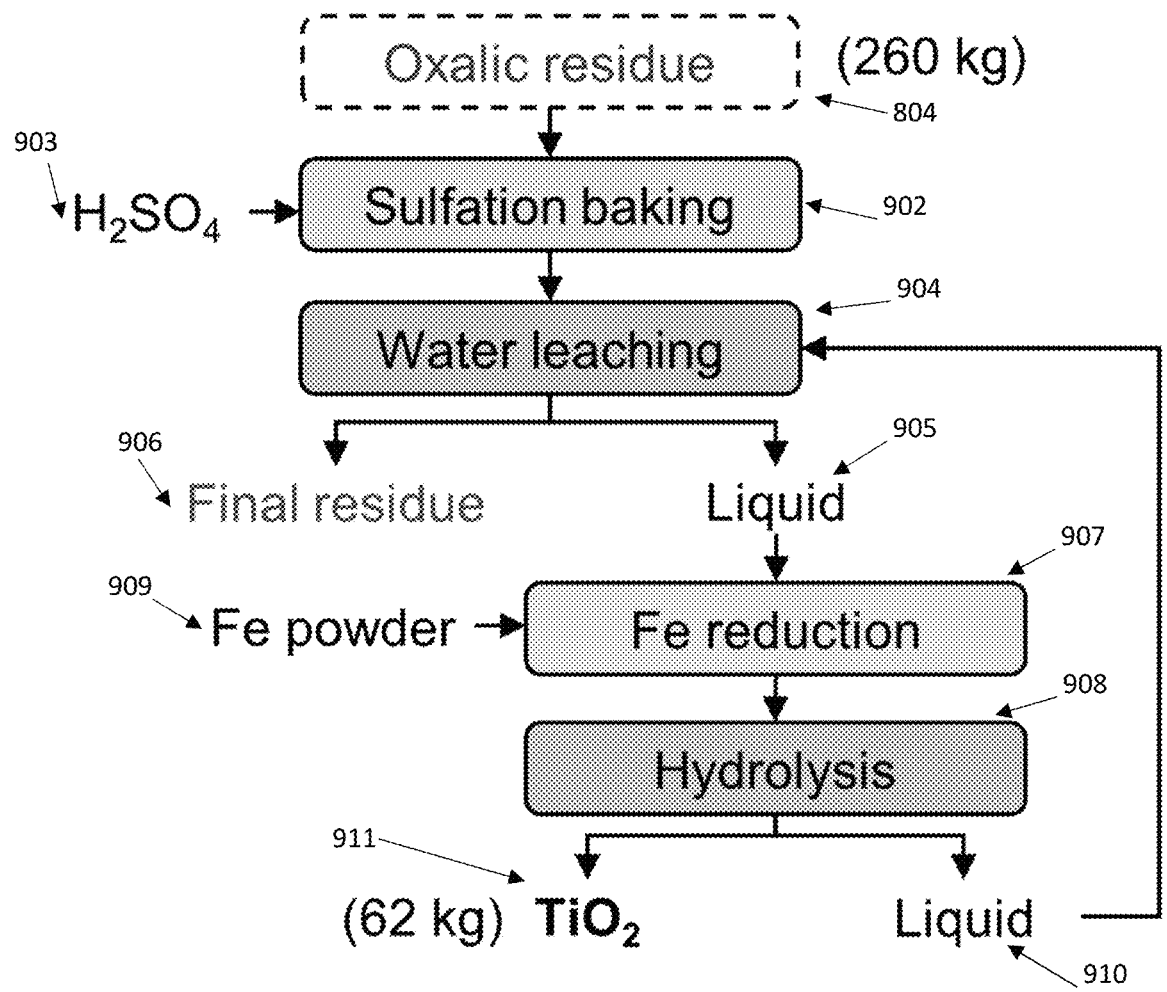
FIG. 9 is a schematic drawing depicting process flow of oxalic residue processing for extracting titanium dioxide.

FIG. 9 is a process flow for extracting titanium from oxalic leaching residue 804 obtained from bauxite neutralized residue 709. The oxalic leaching residue 804 is thoroughly mixed with the required amount of sulfuric acid (1-1.3 mL/g) 903 to form a paste which is further heated in a tubular furnace at a temperature of 250-300° C. for 1-2 h for sulfation reaction or sulfation baking 902. The heated sample is subsequently dissolved in water at 65° C. for 90 min with continuous agitation 904, followed by filtration of leach slurry with a filter press/vacuum filter. The water leaching 904, results in dissolution of 92% Ti, 93% Al, 85% Fe and 24% Si. The liquid solution 905 collected after filtration is treated with Fe powder 909 to reduce dissolved $Fe^{+3}$ to $Fe^{+2}$ 907. The reduced solution is further boiled with water at 100-110° C. for 2-4 h to induce hydrolysis 908 and precipitation of titanium dioxide 911. Titanium dioxide precipitate is recovered from hydrolyzed solution after filtration. The yield of titanium dioxide is more than 95%. The filtrate 910 obtained after hydrolysis and titanium dioxide precipitation can be recycled into the water leaching stage 904 and can aid with reagent regeneration and utilization. The filtrate 910 can also be processed to recover the dissolved Al.

The chemical composition of the bauxite residue, the amount of the each of the products extracted and the amounts of the filtrates are listed in Table IV.

While the system and methods defined herein have been particularly shown and described with references to embodiments thereof, it will be understood by those skilled in the art that various changes in form and details may be made therein without departing from the scope of the invention encompassed by the appended claims.

What is claimed is:

1. A method for recycling a bauxite residue for extracting at least one metal, the method comprising:
   mixing an acid wash solution with the bauxite residue and filtering to obtain a neutralized bauxite residue and a first filtrate;
   decreasing pH of the first filtrate for polymerizing and precipitating silicon dioxide;

filtering the first filtrate to obtain the first metal and a second filtrate thereby extracting the first metal from the bauxite residue; and increasing pH of the second filtrate to precipitate aluminum hydroxide and filtering the second filtrate to obtain the aluminum hydroxide and a third filtrate, the third filtrate including calcium.

2. The method according to claim 1 further comprising carbonating the third filtrate to precipitate a third metal and filtering the third filtrate to obtain the third metal and a fourth filtrate.

3. The method according to claim 2 further comprising recycling the fourth filtrate to the acid wash solution.

4. The method according to claim 2, wherein the third metal is calcium and is precipitated as calcium carbonate.

5. The method according to claim 1 further comprising calcinating the aluminum hydroxide to obtain alumina.

6. The method according to claim 1 further comprising treating the neutralized bauxite residue with a leach acid wash solution to obtain an acid bauxite residue and a leach liquor solution; and reducing the leach liquor solution to obtain a fourth metal.

7. The method according to claim 6, wherein the fourth metal is iron and is precipitated as ferrous oxalate.

8. The method according to claim 7 further comprising decomposing ferrous oxalate to obtain magnetite.

9. The method according to claim 6, wherein reducing further comprises photochemically reducing the leach liquor solution.

10. The method according to claim 6 further comprising mixing the acid bauxite residue with sulfuric acid to obtain a paste; performing a sulfation reaction on the paste; leaching the paste with water to obtain a leach slurry; filtering the leach slurry to obtain a final residue and a slurry solution;

reducing and performing hydrolysis on the slurry solution to obtain a fifth metal.

11. The method according to claim 10, wherein the fifth metal is titanium and is precipitated as titanium dioxide.

12. The method according to claim 6, wherein the leach acid wash solution is oxalic acid solution.

13. The method according to claim 1, wherein the acid wash solution is hydrochloric acid solution.

* * * * *